Aug. 25, 1925.  1,551,269

J. SLEPIAN

PHASE BALANCING SYSTEM

Filed Nov. 28, 1919

These machines have different pole numbers.

WITNESSES:
J. A. Helsel
A. A. Brand

INVENTOR
Joseph Slepian
BY
Wesley G. Carr
ATTORNEY

Patented Aug. 25, 1925.

1,551,269

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed November 28, 1919. Serial No. 340,987.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Phase-Balancing Systems, of which the following is a specification.

My invention relates to means for restoring balanced conditions in systems wherein unbalancing component currents tend to flow by reason of the unbalancing of the system through the derivation therefrom of unequal loads, being especially related to the correction of the unbalanced conditions which exist in a polyphase system from which several unequal single-phase loads are derived.

Figure 1:
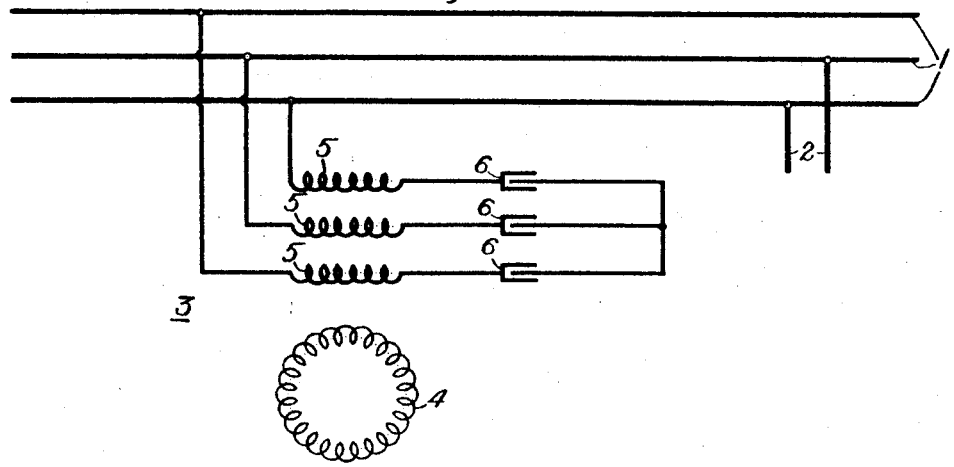
Figure 2:
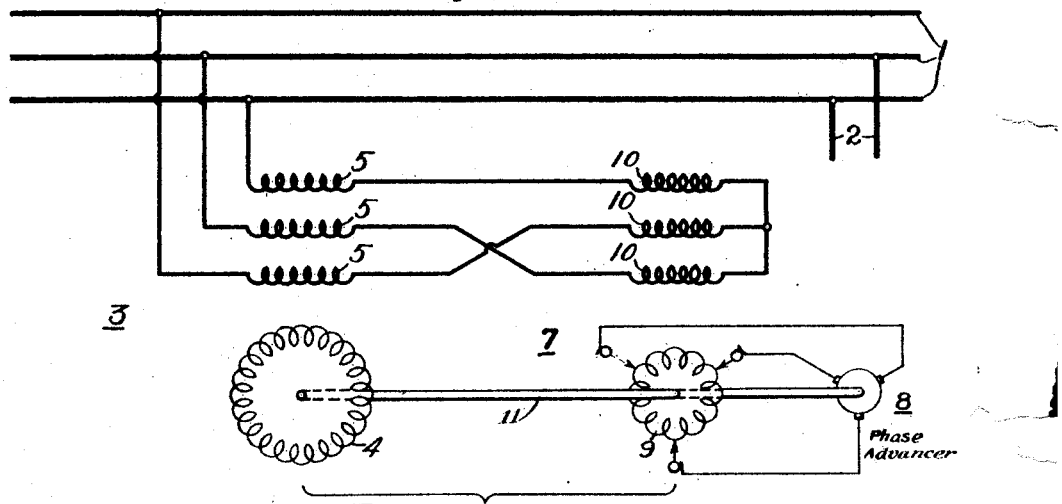

In the accompanying drawing, Figure 1 is a diagrammatic view of one embodiment of my invention; Fig. 2 illustrates a modification of the system and of the unbalancing corrective means illustrated in Fig. 1.

When a polyphase system becomes unbalanced, the resultant voltages obtaining therein may be resolved into two balanced polyphase systems of voltages, and it will be found that the principal or major system will rotate at normal frequency with respect to the polyphase system, while the other balanced polyphase system will rotate in an opposite direction at the same frequency or at double frequency with respect to the forwardly rotating component system.

I find, therefore, that if a path having substantially zero impedance for the backwardly-rotating component currents, that is the unbalancing component currents, is established in parallel relation to a system in which such unbalancing tends to exist, the currents which create the unbalancing tendency will flow through the low impedance path and will thereby be diverted from the polyphase source, thus eliminating, in a large measure, the faulty and undesirable voltage conditions which exist therein upon the appearance of the unbalancing condition. The currents which flow due to the unbalanced condition result in greatly increased heating of the polyphase system on account of the fact that the power therein is not equally distributed between the leads.

Furthermore, I find that, in order to more completely nullify the effect of the unbalancing component currents, it is convenient that the low-impedance path therefor be comprised of a dynamo-electric machine of some character, in order that the unbalanced conditions existing at varying loads may be properly eliminated. Having adopted this character of corrective apparatus, I find that it is necessary to go a step further in order to establish a zero impedance path for the unbalancing currents. Broadly, my idea is to so associate with the leakage reactance of the corrective dynamo-electric machine, condensive elements of such values that series-resonant conditions will be established for the undesirable currents and, therefore, they may flow unimpeded through a circuit which is in parallel relation to the main system.

It becomes, however, a problem of considerable difficulty in solution when one attempts to construct a practical system embodying the above elements, for the reason that no static condensers are at present available which have sufficient capacity to be effective in establishing the required series-resonant conditions in a system in which the unbalance is of considerable degree such, for instance, as may well be the case where a number of large electric furnace loads are derived from a normally balanced polyphase system.

Another object of my invention, therefore, is to associate with a main corrective machine additional dynamo-electric means which shall be instrumental in supplying the required condensive effect to establish the desirable series-resonant conditions. I, furthermore, so dispose and arrange the various elements of my phase balancing unit that a compact and efficient set of dynamo-electric machines is available to accomplish the desired purpose.

Referring now more particularly to the accompanying drawing, a polyphase system is represented by leads 1 and a single-phase circuit 2 is derived therefrom, such connection resulting in the establishment of unbalanced conditions in the polyphase system and the consequent flow therein of unbalancing component currents. A phase balancer 3, here shown as having a rotor winding 4 and a stator winding 5, is connected to the polyphase system. For purposes of illustration only, I show condensive elements 6 as connected in series with the phase windings of the stator member 5, and it is to be understood that these condensive elements are of such value that the unbalancing component currents which exist in the polyphase system are afforded a path of substantial zero impedance, whereby the leakage reactance for these counter-rotating currents is balanced by the condensers, so that the undesirable oppositely rotating voltages cannot be established at the machine terminals.

The combination described differs radically from the use of condensers in the primary circuit of an induction motor for the purpose of improving the power factor, in that currents of 200 per cent of slip frequency traverse the winding 5, and, therefore, the capacitance of the condensers 6 may be small in comparison to those which would otherwise be used. However, I do not believe that even with this reduction in the required capacitance, there exist, at present, static condensers having sufficient capacity to accomplish the desired result.

Referring now to Fig. 2, wherein is illustrated what perhaps may be, at present, designated as the preferred embodiment of my invention, in the absence of static condensive elements having sufficient capacity to accomplish the desired end, the phase balancer 3 is shown as having associated therewith additional dynamo-electric machines 7 and 8, the machine 7 comprising windings 9 and 10, and the machine 8 being shown diagrammatically as of the phase-advancing type whereby, through proper connections, leading current may be drawn by the machine 7. The field-magnet winding 10 is connected in series with the field-magnet winding 5, but for purposes hereinafter to be pointed out, the phase-sequence of the currents in the two windings is reversed, as shown. I have, moreover, indicated that the three dynamo-electric rotors are mounted on a common shaft 11, and it is for this reason that the field windings 10 are reversed with respect to the windings 5, inasmuch as the rotating element 4 runs in substantial synchronism with the normal frequency current in the leads 1. Therefore, the direct-connected member 9 will likewise rotate at synchronous speed of the normal frequency and, in order that the correct frequency relations be established between the windings 10 and 5, it is necessary that they be connected in reverse phase-sequence, as shown.

However, it should be observed that the pole number of the machine 7 differs slightly from the pole number of the machine 3, whereby the former machine operates at a small slip. The currents which are drawn by the machine 8 are, therefore, of such low frequency that the commutation difficulties which are usually experienced with machines of the commutating character are eliminated. This combination, which admits of the commutation of low frequency currents, is of particular advantage in the systems above described.

While I find that the positioning of the rotors on a common shaft is instrumental in promoting the compactness and efficiency of my phase balancing set, it will be understood that the system, in this respect, may be modified without departing, in the least, from the scope of the appended claims.

The constants of the various machines are so adjusted that the condensive effect of the machine 7, as augmented by the phase-advancing characteristics of the machine 8, are such that exact series-resonant conditions are established for the backwardly-rotating system of currents which tend to exist in the unbalanced source but which, by reason of the zero impedance path established therefor, are diverted from the system in their entirety.

While I have shown but two embodiments of my invention, it is obvious that many modifications therein may occur to those skilled in the art, and I desire, therefore, that my invention be limited only by the showing of the prior art or by the scope of the appended claims.

I claim as my invention:

1. A phase-balancing system including a dynamo-electric machine adapted to offer a high impedance to currents of one phase-sequence and a low impedance to currents of another phase-sequence, said low impedance being largely inductive, and means associated with said dynamo-electric machine for inherently producing the effect of a substantially pure series capacitive reactance tending to substantially neutralize said inductive impedance.

2. The combination with polyphase leads adapted to be subject to unbalanced electromotive forces, of a light running phase-balancer associated therewith and comprising a dynamo-electric machine having primary and secondary windings, and a substantially pure capacitive reactance means connected in series-circuit relation to one of said windings to neutralize the reactance of the machine.

3. The combination with polyphase leads adapted to be subject to unbalanced electromotive forces, of a phase-balancer associated therewith and comprising a dynamo-electric machine having primary and secondary windings, said machine being adapted to offer a high impedance to currents of one phase-sequence and a low impedance to currents of another phase-sequence, said low impedance being largely inductive, and series-connected means inherently operable to develop a substantially 90° leading electromotive force proportional to the currents flowing therethrough.

4. A phase-balancer comprising a dynamo-electric machine having a plurality of windings, one of said windings being arranged for connection to a source of unbalancing component currents, and a substantially pure condensive means in series with said winding.

5. A phase-balancer comprising a dynamo-electric machine having a plurality of windings, one of said windings being adapted for connection to a source of unbalancing component currents, and a substantially pure condensive means connected in series therewith, said means having such reactance as to render said winding series-resonant to said unbalancing currents.

6. The combination with a phase-balancing device tending to draw lagging currents of a given phase-sequence, of a series-connected means inherently operable to develop a substantially 90° leading electromotive force proportional to the currents flowing therethrough.

7. The combination with a main dynamo-electric machine having primary and secondary windings, of an auxiliary dynamo-electric machine inherently operable to develop a substantially 90° leading electromotive force proportional to the currents flowing therethrough, said auxiliary machine being connected in series-circuit relation to one of said windings.

8. The combination with polyphase leads adapted to be subject to unbalanced electromotive forces, of a phase-balancer associated therewith and comprising a dynamo-electric machine having primary and secondary windings, and an auxiliary dynamo-electric machine connected in series-circuit relation to said primary windings and adapted to develop an inverse-phase-sequence electromotive force which inherently varies substantially in accordance with the currents flowing in said primary winding.

9. The combination with polyphase leads adapted to be subject to unbalanced electromotive forces, of a phase-balancer associated therewith and comprising a dynamo-electric machine having primary and secondary windings, and an auxiliary dynamo-electric machine connected in series-circuit relation to said primary windings and adapted to develop an inverse-phase-sequence electromotive force which inherently varies substantially in accordance with the currents flowing in said primary winding, said auxiliary machine being initially adjusted to produce, at all times, a substantially series-resonant path to inverse-phase sequence currents drawn by said main machine.

10. The combination with a main induction machine of an auxiliary induction machine connected in inverse phase-sequence in series therewith and a phase advancer associated with said auxiliary machine.

11. The combination with a main induction machine of an auxiliary induction machine connected in inverse phase-sequence in series therewith and a phase advancer associated with said auxiliary machine, said auxiliary machine being initially adjusted to produce, at all times, a substantially series-resonant path to inverse-phase sequence currents drawn by said main machine.

12. In combination with a source of unbalancing component currents, a dynamo-electric machine comprising a plurality of windings, another dynamo-electric machine one of whose windings is electrically connected to one of the windings of the first machine, and means comprising a machine of the phase-advancing type connected to the second machine whereby the connected windings constitute a series-resonant path for the unbalancing component currents.

13. In combination with a source of unbalancing component currents, a dynamo-electric machine comprising a plurality of windings, another dynamo-electric machine one of whose windings is electrically connected to one of the windings of the first machine, means for driving said machines at substantially the same speed, and means comprising a machine of the phase-advancing type connected to the second machine whereby the connected windings constitute a series-resonant path for the unbalancing component currents.

14. The combination with an induction machine having a phase advancer associated therewith, of means for driving said machine at a speed suitable for efficient operation of said phase advancer, said means comprising a mechanically connected induction machine having a pole-number different from said first mentioned induction machine.

15. The combination with an induction machine having a phase advancer associated therewith, of means for causing said machine to operate at a greater slip than normal, said means comprising a mechanically connected induction machine having a pole-number different from said first-mentioned induction machine.

16. The combination with a polyphase translating device carrying positive and negative phase-sequence currents, of an induction machine having primary and secondary windings, means for connecting said primary winding in series-circuit relation to said translating device, and a phase-advancer connected to said secondary winding, said machine running backwardly with respect to said positive phase-sequence currents at a speed differing from synchronous speed by a certain slip.

17. The combination with an induction machine having a phase advancer associated therewith, whereby said machine offers a reactive impedance to certain currents, of a series-connected device associated with said machine and having a reactive impedance which is substantially equal and opposite to said first-mentioned reactive impedance.

18. A circuit adapted to carry alternating currents, said circuit including tuned reactance elements, one of said elements being an induction machine coupled with a phase-advancer.

19. The combination with an induction machine running light, of a phase-advancer associated therewith and adjusted to cause said machine to draw leading currents, and a reactance device in series with said machine, said leading currents and reactance device being such as to establish a resonance condition.

20. The combination with an alternating-current line having components of electromotive force which, if applied separately, would drive an induction machine at different speeds, of a device associated therewith offering a relatively high impedance to currents corresponding to one of said components and a relatively low inductive impedance to currents corresponding to the other of said components, an induction machine running at synchronous speed, minus a certain slip, with respect to said last-mentioned currents, means for connecting said machine in series-circuit relation to said device, and a phase-advancer associated with said machine and adjusted to cause said machine to draw leading currents.

21. The combination with an alternating-current line having components of electromotive force which, if applied separately, would drive an induction machine at different speeds, of a device associated therewith offering a relatively high impedance to currents corresponding to one of said components and a relatively low inductive impedance to currents corresponding to the other of said components, and a series-connected dynamo-electric machine adjusted to draw substantially wattless leading currents corresponding to said second-mentioned component.

22. A phase-balancing system including a dynamo-electric machine adapted to offer a high impedance to currents of one phase-sequence, and a low impedance to currents of another phase-sequence, said low impedance being largely inductive, and a series-connected dynamo-electric machine adjusted to draw substantially wattless leading currents of said last-mentioned phase-sequence.

In testimony whereof, I have hereunto subscribed my name this 18th day of November 1919.

JOSEPH SLEPIAN.